United States Patent [19]

Li et al.

[11] Patent Number: 4,896,241

[45] Date of Patent: Jan. 23, 1990

[54] DIRECTIONAL COMPARISON BLOCKING PROTECTIVE RELAY SYSTEM

[75] Inventors: Hung J. Li, Coral Springs, Fla.; Deborah K. Mort, Wilkins Twp., Allegheny County, Pa.

[73] Assignee: Westinghouse Electric Corp., Pittsburgh, Pa.

[21] Appl. No.: 317,163

[22] Filed: Feb. 28, 1989

[51] Int. Cl.[4] ............................................. H02H 3/30
[52] U.S. Cl. ........................................ 361/66; 361/66
[58] Field of Search ..................... 361/64, 66, 68, 79, 361/80, 81

[56] References Cited

U.S. PATENT DOCUMENTS

| | | | |
|---|---|---|---|
| 4,484,245 | 11/1984 | McFall | 361/68 |
| 4,674,002 | 6/1987 | Li et al. | 361/66 |
| 4,725,914 | 2/1988 | Goritty | 361/81 |
| 4,731,689 | 3/1988 | Nimmersie et al. | 361/664 |

Primary Examiner—Derek S. Jennings
Attorney, Agent, or Firm—B. R. Studebaker

[57] ABSTRACT

A directional comparison relaying system includes forward looking pilot relays at each terminal of a protected line segment and monitors which detect predetermined incremental changes in line currents and voltages indicative of a fault. These predetermined incremental changes in current or voltages, which can be detected before the pilot relays respond, generate local blocking signals which are transmitted to the other terminal as remote blocking signals over a two-way communications channel. Trip signals for tripping circuit breakers at the associated terminals are generated from forward fault signals produced by the pilot relays but are blocked by the presence of either a local or remote blocking signal. However, the forward fault signal cancels the local blocking signal and the corresponding remote blocking signal at the other terminal so that when both pilot relays see an internal fault, the circuit breakers at the two terminals are tripped simultaneously. Either a reverse direction distance relay or a reverse ground current relay and a zero sequence current monitor, generate a transient blocking signal which maintains the local blocking signal and its corresponding remote blocking signal at the other terminal, and blocks a trip signal during transient fault clearing in other line segments to prevent overtripping.

15 Claims, 7 Drawing Sheets

DIRECTIONAL COMPARISON BLOCKING PROTECTIVE RELAY SYSTEM

BACKGROUND OF THE INVENTION

1. Field of Invention

This invention relates to protective relay systems for electric power transmission circuits and more particularly to directional comparison blocking systems.

2. Background Information

Electric power transmission lines are protected against faults by protective relay systems which operate circuit breakers to isolate the faulted segment of the line. Such systems include protective relays at each terminal of the protected line segment which analyze line currents and voltages to determine the location of a fault and trip the circuit breakers at the respective terminals to isolate a fault determined to be between the terminals.

In one type of protective relay system known as pilot relaying, the protective relays at each end of the transmission line communicate with each other via a bidirectional communication link. The relays at each terminal compare fault location information to determine if the fault is on the intervening line segment. If the comparison indicates that the detected fault is internal, i.e., between the two protective relays, the intervening transmission line section is isolated by tripping the circuit breakers at the line terminals. If the comparison indicates the fault is not between the two protective relays, the circuit breakers remain closed.

The communications channel linking the two relays can employ a modulated carrier signal transmitted over a power line phase conductor or over a microwave system, or audio tones propagated on a leased telephone line or a dedicated pilot wire.

While there are many different types of pilot relaying systems, the blocking pilot relay system is commonly employed. In the traditional blocking system, the carrier signal transmitted over the communications link is used only to prevent one or more of the protective relays from tripping on an external fault. A carrier signal is not required for internal faults, i.e., tripping occurs in the absence of a carrier signal. When the carrier signal is present, the protective relays are blocked from tripping.

To detect a fault with a pilot relaying system, either directional comparison relays or phase comparison relays are used at each terminal. In the directional comparison scheme, fault detecting relays compare the direction of current flow at the two line terminals. Current flow into the line at both terminals indicates an internal fault, and the circuit breakers at each terminal of the line are tripped. If the current flows into the line at one terminal and out at the other, the fault is external and the line remains in service. In addition to the usual forward looking relays in each terminal, the directional comparison blocking scheme is generally composed of, at each terminal, forward looking relays for pilot tripping, reverse looking relays for carrier start, and a carrier auxiliary relay. The performance of the carrier start relay is important, since it affects the operating speed, dependability and the security of the scheme. Traditionally, a separate unit is used.

In general the carrier starting units on a blocking relaying scheme require coordination, on both distance and time, with remote pilot tripping units. In the traditional approach, the carrier start function is performed by a dedicated reverse looking phase distance unit and a non-directional overcurrent ground unit. The characteristic of the distance start unit should include the detection of close in reverse direction faults. Since the forward tripping distance unit does not require this characteristic, this means that a normal distance unit is not suitable for the carrier starting function. Furthermore, the overcurrent ground unit used in the conventional directional comparison blocking scheme may have a problem in some applications, for example, in a severely unbalanced load condition or on an untransposited line system, i.e., a system in which the lines are not twisted and hence a large zero sequence current can flow. Under such conditions, another reverse looking distance unit is needed for carrier starting to replace the overcurrent unit.

U.S. Pat. Nos. 4,484,245 and 4,674,002 disclose a variation on the directional comparison blocking scheme which eliminates the reverse looking unit by using the echo key approach. In the echo key system, the pilot relay initiates the carrier signal for a short duration upon detection of a fault in the forward direction; that is, in the direction of the other terminal. If the pilot relay at the other terminal does not detect a fault in the forward direction, it sends out a carrier signal for a longer duration upon termination of the short duration carrier signal received from the first terminal. Tripping at the first terminal is blocked by the carrier signal of long duration, while the other terminal does not trip since it did not see a fault. The echo key concept is limited to applications in which the echo key circuit is provided at both terminals.

While conventionally, the various relays have been implemented at each terminal by discrete electromechanical or electronic relays, microprocessor based relays are now in service in which the various relaying functions are performed by software. In addition to performing relay functions previously performed by discrete relays, the flexibility of the microprocessor based relaying systems has provided the opportunity for additional relaying schemes. For example, the processing capability of digital protective relays has been employed to detect incremental changes in voltage and current which provide much more rapid indication of the onset of fault conditions.

While the present protective relaying systems provide excellent protection for electric power transmission lines, there is always a need for faster more dependable systems.

In particular, there is a need for such improvement in blocking protective relay systems, and in particular, direction comparison blocking relay schemes.

There is a need for such improved directional comparison blocking schemes which are sensitive but which do not overblock.

SUMMARY OF THE INVENTION

These and other needs are satisfied by the invention which is directed to a directional comparison blocking relay system in which the terminals at the opposite ends of a protected line segment each have monitoring means which monitor the currents and voltages at the associated end of the protected line segment and generate incremental change signals in response to predetermined incremental changes in the currents and voltages indicative of a fault condition.

Each terminal unit also includes a forward looking pilot relay means responsive to the currents at that terminal and having a forward zone extending beyond the other terminal unit. These pilot relay means generate a forward fault signal in response to a fault in the forward zone, however, they respond to a fault more slowly than the monitoring means which generate the incremental change signals.

Each terminal further includes logic means including blocking signal generating means which generate a local blocking signal in response to the incremental change signals. The local blocking signal is transmitted by the local transmitter over a communications channel to a receiver at the other terminal as a remote blocking signal. The logic means in each terminal also includes trip signal generating means which generates a trip signal in response to a forward fault signal generated by the pilot relay means. Trip blocking means blocks the generation of a trip signal, however, in response to either a local blocking signal or a remote blocking signal. Since the monitoring means responds more rapidly than the pilot relay means, the local and remote blocking signals are generated before the forward fault signal, and hence, block generation of a trip signal. However, each terminal logic means also include blocking signal stop means which are responsive to the generation of the forward fault signal by the pilot relay means to cancel the local blocking signal and hence the remote blocking signal at the other terminal. This results in simultaneous tripping of the circuit breakers at each terminal upon detection by the slowest pilot relay means of an internal fault. In the case of an external fault, the incremental change signals are also generated at each terminal The terminal that sees the forward fault will be blocked from tripping by the remote blocking signal received from the other terminal. The other terminal will not trip because it does not see a forward fault.

To speed up tripping in response to a large internal fault, a high speed trip signal generated by a forward looking relay responsive to large fault currents, can be used to stop the blocking signals and expedite response of the system to the forward fault signals generated by the pilot relay means.

In order to prevent a system from tripping in response to transients generated in clearing faults in other protected line segments, including temporary current reversals, the system includes reverse direction fault sensing means which generates a transient blocking signal which maintains the local blocking signal and also blocks generation of the trip signal for a predetermined interval which is preferably about two cycles of the power system. This reverse direction fault sensing means preferably includes reverse direction distance measuring relay means and means which sense the simultaneous presence of zero sequence current above a predetermined threshold and reverse direction ground current above a threshold level for a preselected interval, which is preferably one cycle of the power system.

The present invention provides improved response time to internal faults with simultaneous tripping at both terminals. It also provides increased security in not responding to transients caused by fault clearing in other line segments and particularly to power reversals caused by such transients.

BRIEF DESCRIPTION OF THE DRAWINGS

A full understanding of the invention can be gained from the following description of the preferred embodiment when read in conjunction with the accompanying drawings in which:

FIG. 7b is a schematic diagram similar to FIG. 7a identifying an internal fault after the external fault identified in FIG. 7a.

DESCRIPTION OF THE PREFERRED EMBODIMENT

Figure 1:
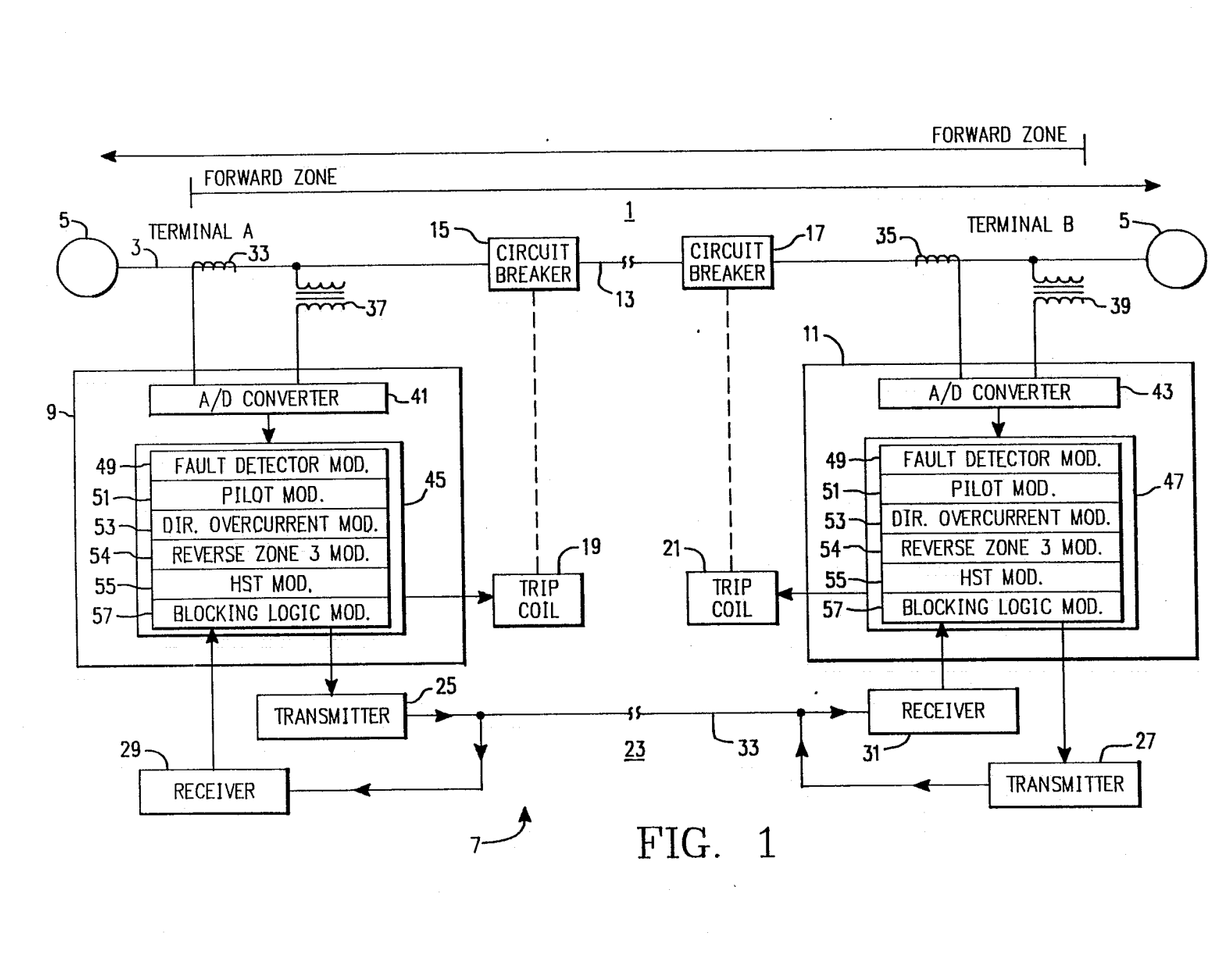
FIG. 1 is a schematic diagram in block form of a portion of an electric power transmission circuit incorporating a directional comparison blocking system in accordance with the invention.

FIG. 1 illustrates a portion of an electric power transmission circuit 1 to which the invention is applied. The transmission circuit includes a three-phase electric power line 3 which can be fed at opposite ends by generators 5. The directional comparison blocking system 7 includes protective relays 9 and 11 at the terminals A and B respectively of a protected line segment 13 of the electric power line 3. Also located at the terminals A and B are circuit breakers 15 and 17 respectively, each having a trip coil 19 and 21 which is operated by the associated protective relay.

The protective relays 9 and 11 communicate through a communications link 23 which includes transmitters 25 and 27 and receivers 29 and 31 at the respective terminals linked by a communication channel 33. In the exemplary system, the frequencies of the transmitters 25 and 27 are identical, therefore, each of the transmitters 25 and 27 transmits signals to the receivers 29 and 31 at the other terminal and to its own receiver.

The protective relays 9 and 11 monitor the currents and voltages in the protected segment 13 of power transmission line 3 through current transformers 33 and 35 and potential transformers 37 and 39 respectively. In the preferred form of the invention, the protective relays 9 and 11 are microprocessor based Hence, the analog currents and voltages monitored by the current transformers 33, 35 and potential transformers 37, 39 are converted to digital signals by analog to digital converters 41 and 43 for input to microprocessors 45 and 47 respectively. The A/D converters sample the applied currents and voltages several times per cycle; eight times per cycle in the preferred embodiment.

The microprocessors 45 and 47 are operated by software which includes a fault detector module 49. This module monitors the digital samples of current and voltage for each phase of the protected line segment and for the zero sequence currents and voltages and generates $\alpha I$ and $\alpha V$ signals upon detection of predetermined incremental changes in any of these currents or voltages between cycles These incremental changes are selected to be indicative of a fault in the power transmission line 3. In the exemplary system, these incremental changes are 1 ampere for the currents and 7 volts for the voltages and the changes must be greater than 12.5%.

As long as $\Delta I$ and $\Delta V$ remain below the predetermined values, the protective relays operate in a background mode Upon detection of incremental changes in current or voltage which exceed the predetermined limits, the relay transfers to a fault mode. In the fault mode, impedance modules operate in a known manner to determine the forward distance, that is the distance in the direction of the other terminal of the protected line segment 13, to a fault by determining the complex impedances of the line from the currents and voltages, and comparing those impedances to preset reach settings for the module. If any of the calculated impedances are less than the reach settings, indicating the fault is between the terminals A and B, a trip signal for one or more of the phases of the respective circuit breakers 15 or 17 is provided to the associated trip coil 19 or 21. The protective relays 9 and 11 remain in the fault mode for at least three cycles even though the current may fall below the limits before then.

As mentioned, the protective relays 9 and 11 are part of a directional comparison blocking system. The pilot module 51 in each relay performs a forward looking distance measuring relay function with a reach which extends beyond the terminal at the other end of the protected line segment 13. Thus, it can detect faults which are external to the protected line segment as well as internal faults. If both of the pilot relays see a fault, the fault is internal. However, if only one of the pilot relays sees the fault, it is an external fault behind the terminal which does not see the fault. The pilot modules determine the distance to faults in the forward direction for all types of faults and generate signals PLTP and PLTG.

The software for the protective relays 9 and 11 also includes a directional overcurrent ground module 53. This module monitors the reverse direction ground current and generates an RDOG signal if this current indicates a ground fault in the reverse direction. The module 53 also generates a non-directional $I_{os}$ signal if the zero sequence current exceeds a limit indicative of a fault.

A reverse zone 3 module 54 is a distance measuring relay which looks in the reverse direction from the terminal and detects all types of faults within a designated distance from the terminal.

The software for the protective relays 9 and 11 further includes an HST module 55 which generates a high speed trip signal HST in response to a high current setting trip or a zone one trip for a fault in the zone between terminals.

Another software module in the protective relays 9 and 11 is the blocking logical module 57. A functional diagram of this software is set forth in FIG. 2. The purpose of the blocking logic is to generate a local blocking signal upon entry of the relay into the fault detection mode through detection of the incremental changes of predetermined magnitude in current or voltage at the associated terminal. This local blocking signal is also transmitted to the other terminal as a remote blocking signal. Trip signals at each terminal are blocked by either a local or remote blocking signal. The purpose of the blocking signals is to coordinate the operation of the two protective relays at the opposite ends of the protected line segment. They prevent tripping at either terminal until the pilot relays have had time to operate and to compare their responses. Operation of the local pilot relay cancels the local blocking signal and the remote blocking signal at the other terminal. If the pilot relay at the other terminal also operates, canceling its local blocking signal and the remote blocking signal it transmits, the pilot relays simultaneously generate trip signals.

Figure 2:
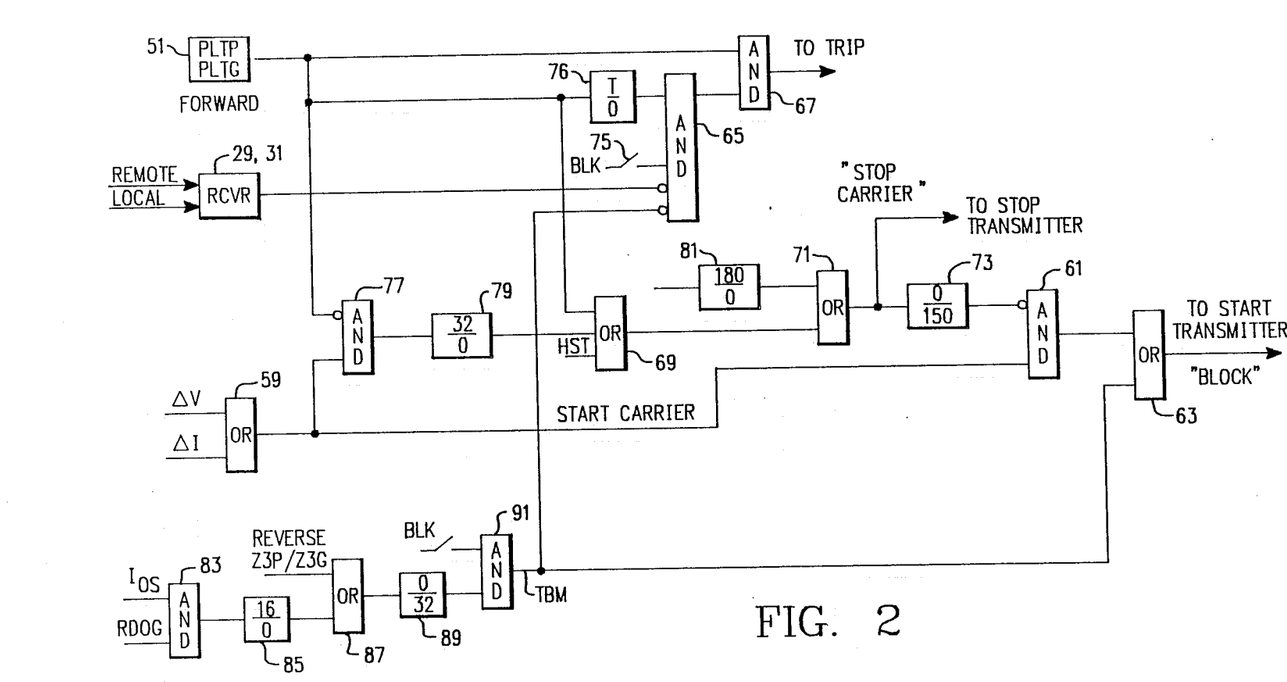
FIG. 2 is a logic diagram for a portion of the directional comparison blocking system of FIG. 1.

Turning to FIG. 2, detection of an incremental change in a current or voltage at the associated terminal which exceeds the predetermined limits indicative of the onset of a fault, as determined by the fault detector module 49 (see FIG. 1), causes one or more of the signals $\Delta I$ and $\Delta V$ applied to OR gate 59 to go high to generate a START CARRIER signal. This occurs within about 2 ms. of the onset of a fault. The START CARRIER signal is applied to an AND gate 61, the output of which is applied to an OR gate 63. As long as a negated second input enables AND 61, the START CARRIER signal generates a blocking signal BLOCK at the output of OR 63 which is applied to the transmitter 25 or 27 at the associated terminal to generate a carrier signal which is transmitted as a remote blocking signal to the receiver 29 or 31 at the other terminal over the communications link 23. The BLOCK signal is also sent by the local transmitter to the local receiver as a local blocking signal.

The local blocking signal, identified as LOCAL, in FIG. 2, and the remote blocking signal identified as REMOTE are ORED by the receiver 29, 31, and applied through a negated input to an AND GATE 65 which controls another AND gate 67. The AND gate 67 generates a trip signal in response to a PLTP/PLTG signal indicative of multiphase fault (PLTP) or a phase to ground fault (PLTG) detected by the forward looking pilot relay, the function of which is carried out by the pilot module 51. However, as long as there is a LOCAL or REMOTE blocking signal present, AND 67 is disabled by AND 65 and the trip signal is not generated.

If the local pilot relay sees either a multiphase (PLTP) or a phase to ground (PLTG) fault in the forward direction, the signal PLTP/PLTG goes high causing the output of an OR gate 69 to go high. This in turn causes the output of another OR gate 71 to go high to generate a STOP CARRIER signal which is applied to the transmitter to stop transmission of the carrier signal. The STOP CARRIER signal is applied through a delay 73, identified as Squelch, to the negated input of AND 61. The standard convention for delays such as 73 is used in FIG. 2. The numeral above the line within the box representing the delay indicates the delay in pickup expressed here in milliseconds, while the numeral below the line is the delay in drop out. Thus, the delay 73 applies the STOP CARRIER signal immediately to AND 61, but has a 150 ms. delay in drop out. The purpose of the squelch delay in a blocking scheme is to hold off the carrier for a period of time after the local breaker is tripped. This ensures that the other terminal of the protected line segment can be tripped before allowing the carrier to be retransmitted for any other functions, such as voice service for example. For the blocking scheme of the invention, the squelch function is not as important as in the conventional blocking scheme. Both terminals will always be simultaneously tripped by the invention, which is one of the unique features of it. However, the presence of the squelch circuit makes the system compatible with mixed systems, that is, a system in which the protective relay at the other end of the protected line segment does not employ the invention.

The STOP CARRIER signal disables AND 61 to terminate the BLOCK signal. This causes the LOCAL signal at that terminal to go low as well as the REMOTE signal at the other terminal. If the pilot relay at the other terminal has also seen the fault, it will similarly cause its LOCAL signal to go low as well as the REMOTE signal at the first terminal.

With both the LOCAL and REMOTE signals low, the outputs of the receivers 29 and 31 go low. Assuming for the present that the TBM signal applied to another negated input to AND gate 65 is low, and that the switch 75 is closed, the AND gate 65 will enable AND gate 67 when the PLTP/PLTG signal has been high for the delay interval set by the delay 76. The delay 76 is a channel coordination timer which can be set from 0 to 32 ms. in 2 ms. increments. This delay is only needed when the present invention is used at one terminal and another slower blocking relay is used at the other terminal. When the other relay is also in accordance with the invention and the channel time is less than 10 ms., T is set to zero. With AND gate 67 enabled, the PLTP/PLTG signal generates a trip signal. The switch 75 can be used to select the disclosed blocking scheme.

In order to speed up operation of the relay in the case of high current faults in the protected zone between terminals, the high speed trip signal HST is also applied to OR gate 69 to cancel the BLOCK signal. This will expedite cancellation of the local blocking signal as well as the remote blocking signal at the other terminal, which, due to the reset time of the communications link, normally delays generation of the trip signal.

If there is a weak feed condition at one terminal, the pilot relay at that terminal may not pick up in response to an internal fault. If this occurs, neither terminal can trip. The terminal with the weak source will not trip because it does not see the fault, and the other terminal cannot trip because it continues to receive a remote blocking signal which is started by the ΔV or ΔI signal from the weak feed terminal. In order to solve this problem, the PLTP/PLTG signal from the pilot relay is applied through a negated input to an AND gate 77, the output of which is applied through a delay 79 with a 32 ms. delay in pickup to the OR gate 69. The output of OR 59 is also applied to AND 77. Thus, if the PLTP/PLTG signal does not go high within 32 ms. (2 cycles), the BLOCK signal is canceled. This will cancel the remote blocking signal at the other terminal allowing its breaker to trip. A 52b signal which is high when the associated circuit breaker is open is applied through delay 81 with a 180 ms. delay in pickup to cancel the BLOCK signal to allow the other breaker to trip on internal faults when the local breaker is open and line side potential is used. The 180 ms. timer delay prevents overtrip at the remote end on local bus fault clearing.

To prevent false tripping on transients during clearing of an external fault, a transient blocking signal TBM is generated. TBM maintains the BLOCK signal through OR 63 and blocks the generation of a trip signal through a negated input to AND gate 65. The $I_{os}$ and RDOG signals generated by the directional overcurrent module 53 in response to a reverse direction fault are applied to an AND gate 83, the output of which is applied through a 16 ms. delay 85 to an OR gate 87. A second input to OR gate 87 is a REVERSE Z3P/Z3G signal which goes high in response to reverse distance phase or ground fault detected by module 54 in FIG. 1. The output of OR 87 is applied through delay 89 to an AND gate 91 which generates the TBM signal Delay 89 provides for continuation of the TBM signal for 32 ms. (2 cycles).

Figure 3:
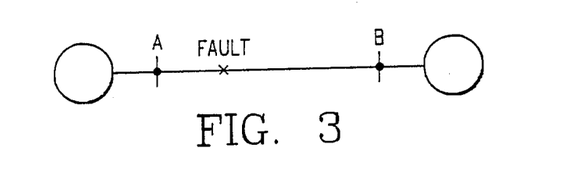
FIG. 3 is a schematic diagram illustrating the location of an internal fault in the electric transmission circuit.
Figure 4:
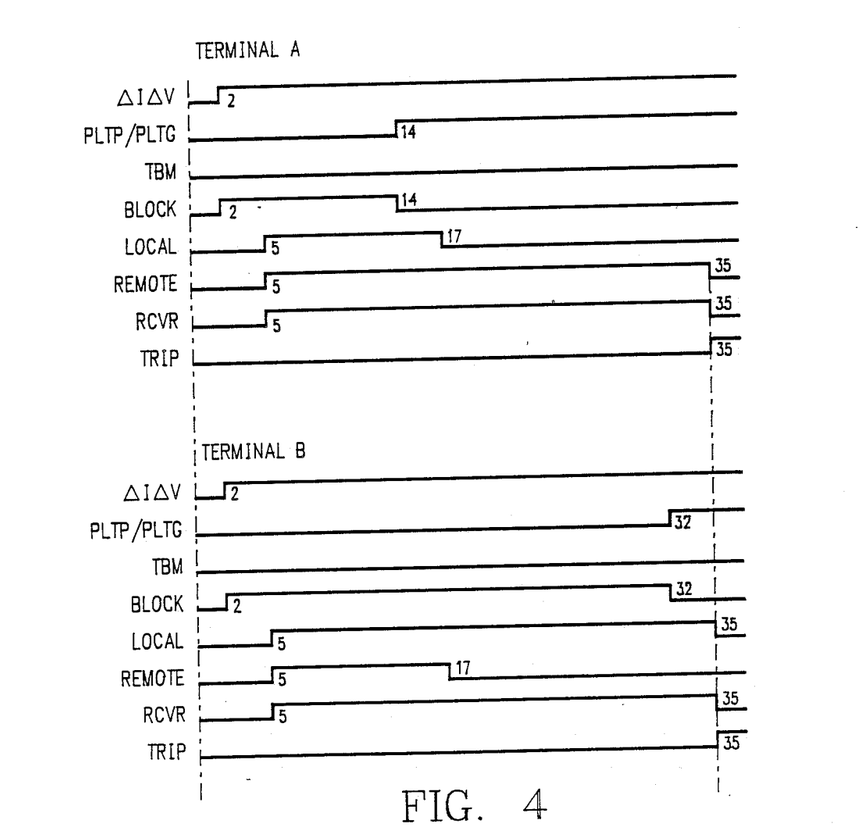
FIG. 4 is a timing diagram illustrating the operation of the system of FIG. 1 in response to the fault identified in FIG. 3.

FIG. 4 is a timing diagram illustrating operation of the blocking system in response to an internal fault occurring between the terminals A and B as shown in FIG. 3. This timing diagram together with those of FIGS. 6 and 8 to be discussed, assume pick-up and reset times for the indicated units as follows:

|  | Pick-up time | Reset time |
| --- | --- | --- |
| ΔI and ΔV | 2 ms. | 16 ms. |
| Forward unit at A | 14 ms. | 0 |
| Forward unit at B | 32 ms. | 0 |
| Carrier channel | 3 ms. | 3 ms. |

For an internal fault, FIG. 4 shows that the ΔI/ΔV signals at both terminals pick up 2 ms. after the fault, to generate BLOCK signals The local block signals LOCAL go high 3 ms. later which is the pick-up time of the communications link, and each terminal receives the remote block signal REMOTE at the same time Hence, the receiver signal RCVR goes high to block the TRIP signal The pilot relay at terminal A sees the fault (PLTP/PLTG goes high) 14 ms. after the onset of the fault and cancels BLOCK. This cancels the LOCAL signal at terminal A and the REMOTE signal at terminal B 3 ms. later. Despite the PLTP/PLTG signal at terminal A and the cancellation of the LOCAL signal, terminal A does not generate a trip signal because it is still receiving the REMOTE signal from terminal B, hence RCVR remains high to block TRIP. Terminal B does not trip because it does not yet see the fault (PLTP/PLTG remains low) and RCVR at this terminal remains high because LOCAL remains high, and TRIP is blocked.

When the pilot relay at terminal B sees the fault, PLTP/PLTG goes high to cancel BLOCK, and 3 ms. later LOCAL at terminal B, and REMOTE at terminal A are canceled. The RCVR signals at each terminal therefore go low and TRIP is generated by the local PLTP/PLTG signals from the pilot module. The system can be speeded up by the high speed trip signal HST if a slow communications channel is used in the scheme.

Figure 5:
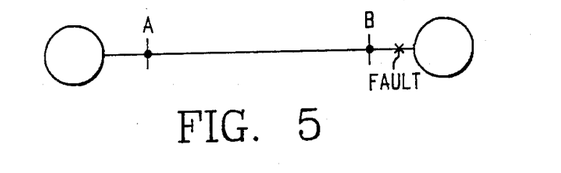
FIG. 5 is a schematic diagram illustrating the location of an external fault in the electric power transmission circuit.
Figure 6:
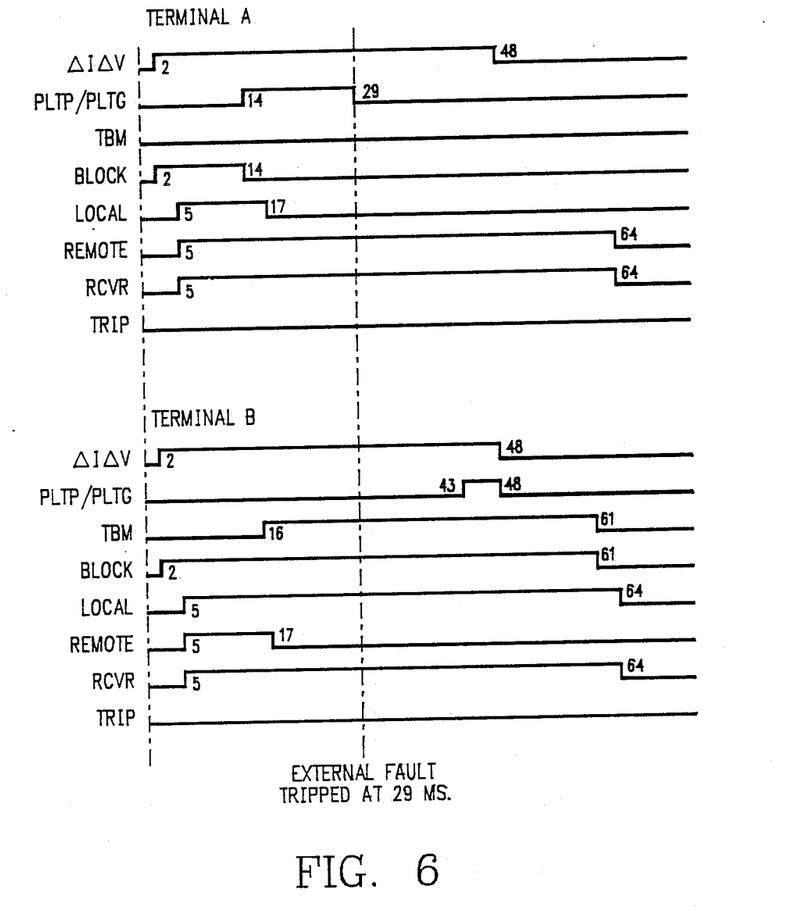
FIG. 6 is a timing diagram illustrating the operation of the invention in response to the external fault identified in FIG. 5.

Response of the system to the external fault depicted in FIG. 5 is shown by the timing diagram of FIG. 6. Since the fault is in the forward direction for terminal A, it responds initially as in the case of an internal fault. At terminal B, TBM is picked up 16 ms. after the fault in response to the detection of reverse direction ground current RDOG and zero sequence current above limits $I_{os}$. Neither terminal trips in response to the external fault. Terminal A does not trip because it is receiving a REMOTE blocking signal from terminal B. Terminal B does not trip because its pilot relay does not see the fault.

In the example of FIG. 6, the external fault is tripped by breakers in the line segment in which the fault occurs at 29 ms. The forward looking pilot relay at terminal B may pick up in response to transients generated by unequal pole clearing of the external fault and terminate the output of AND 61 which had been generating BLOCK. This may cause a false trip at terminal A if the tripping relay is slow to reset. The TBM logic solves this problem by providing continuation of the BLOCK signal to maintain the keying action for a short period after the external fault is cleared.

Figure 7A:
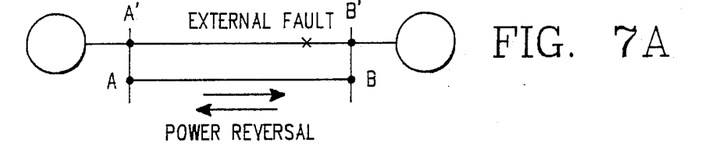
FIG. 7a is a schematic diagram of an expanded portion of electric power transmission circuit including a parallel line segment and identifying an external fault in the parallel line segment.
Figure 8:
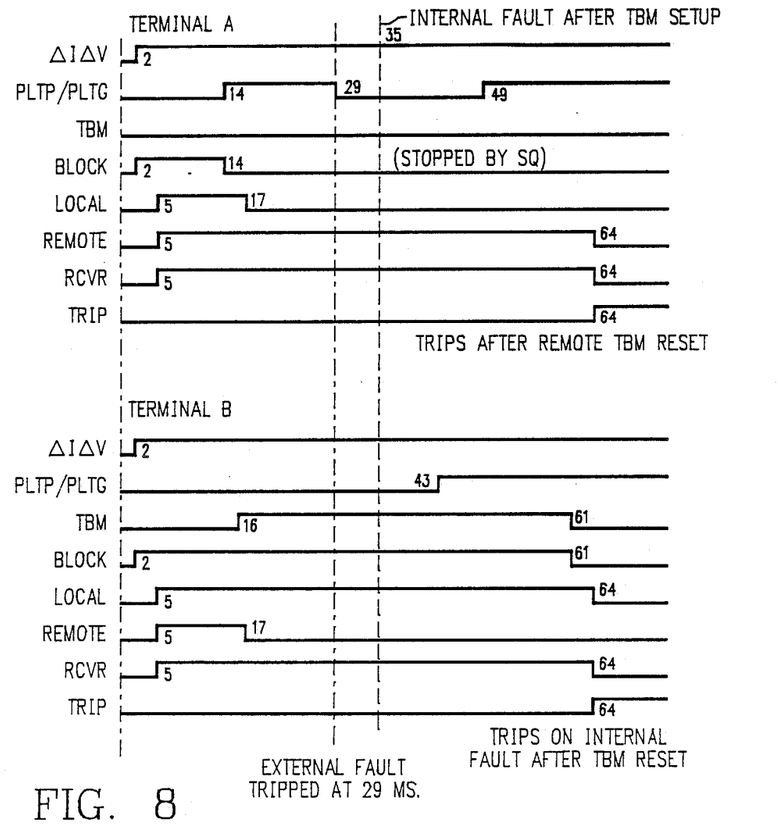
FIG. 8 is a timing diagram illustrating the operation of the invention in response to the fault sequence identified in FIGS. 7a and 7b.
Figures 9, 10:
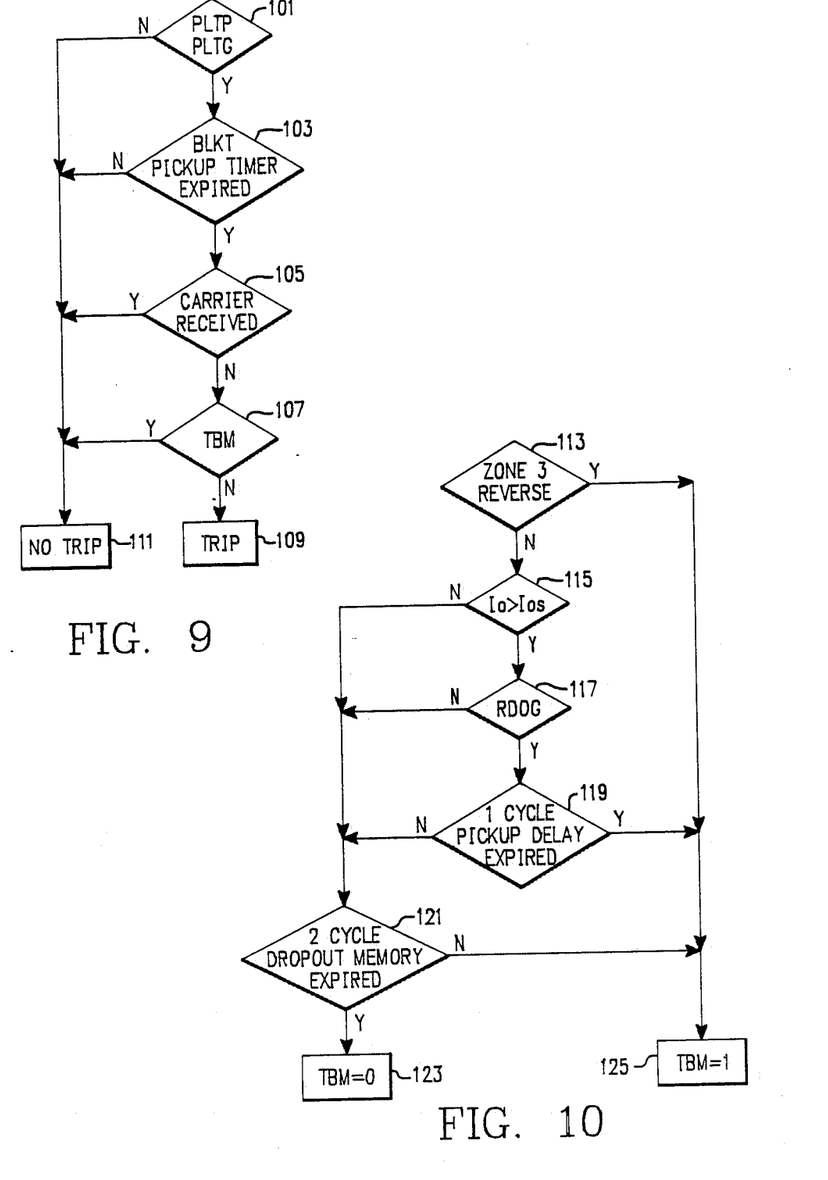
FIG. 9 is a flow chart of a computer program for implementing pilot trip logic in accordance with the invention.
FIG. 10 is a flow chart of a computer program for implementing the transient block mode of the invention.
Figure 11:
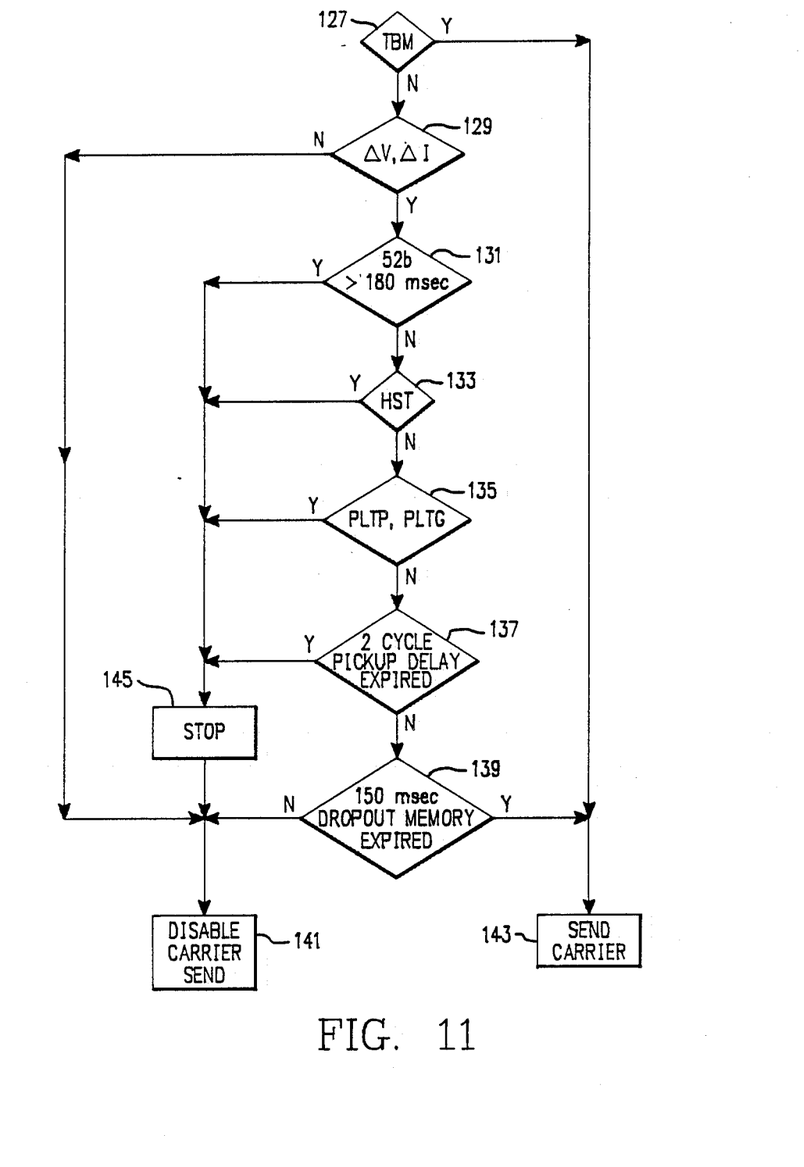
FIG. 11 is a flow chart of a computer program for implementing carrier send logic in accordance with the invention.

After 48 ms., the $\Delta I/\Delta V$ signals go low (the system maintains $\Delta I/\Delta V$ for 3 cycles after fault inception). This causes PLTP/PLTG at terminal B to go low. The TBM signal goes low when the delay 89 times out 32 ms. after the external fault was tripped at 29 ms. (61 ms. after fault inception). This results in resetting of the relays 3 ms. later when the LOCAL signal at terminal B and the remote signal at terminal A are canceled FIG. 7a illustrates an external fault in a line segment A'-B' parallel to the protected segment between. terminals A and B. Assuming that terminal B' trips in 29 ms. with slow tripping at terminal A', there will be a power reversal in the protected line segment between terminals A and B. FIG. 8 illustrates the timing diagram for this occurrence. Before the external fault is tripped, the relays at terminals A and B respond in the same manner as for the case of an external fault on a single line system.

Figure 7B:
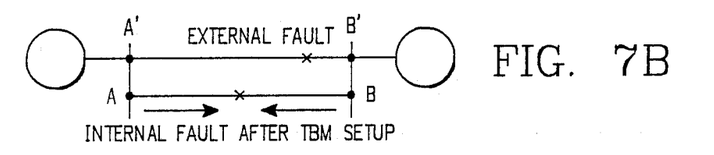

After the external fault trip at 29 ms. and power reversal the $\Delta I/\Delta V$ signals at terminals A and B remain high. At terminal A, the forward looking relay resets (PLTP/PLTG goes low) in response to the power reversal Assume then, that during the reverse power condition an internal fault occurs. As shown in FIG. 7b, this will result in forward current at both terminals A and B. The forward looking relay at B sees the internal fault at 43 ms. but does not trip because of the LOCAL blocking signal maintained by TBM. In the example, the pilot relay at terminal A picks up on the internal fault at 49 ms. There is no LOCAL blocking signal at terminal A since the squelch timer maintains the STOP CARRIER signal for 150 ms. after reset of the terminal A pilot relay. However, a trip at terminal A is blocked by the REMOTE signal maintained by the TBM signal at terminal B TBM at terminal B drops out 32 ms. after the reverse current relay at terminal B drops out with the power reversal Then, TBM drops out at 61 ms. in the example This cancels the LOCAL signal at terminal B and the REMOTE signal at terminal A 3 ms. later and the circuit breakers at terminals A and B trip simultaneously.

Had there been no internal fault during the power reversal, TBM would have been generated at terminal A when the reverse current relay detected the power reversal. Thus, even though the squelch delay would have blocked BLOCK for 150 ms., TBM would have provided BLOCK to generate a LOCAL blocking signal at terminal A and a REMOTE blocking signal at terminal B. At terminal B, the pilot relay would have picked up and the TBM signal at terminal B would only have provided blocking for 32 ms. However, tripping at terminal B would have been blocked after that by the REMOTE signal from terminal A. The TBM signal at terminal A would be maintained for 32 ms. after the terminal. A reverse current relay dropped out following termination of the power reversal. If an internal fault occurred before then, tripping at both terminals on the internal fault would occur similar to that discussed above, but delayed until TBM at terminal A dropped out.

These examples illustrate that the present invention provides protection for even worst case conditions.

As mentioned, the invention is implemented in its preferred form in a microprocessor based protective relay system. FIGS. 10 through 12 illustrate flow charts for suitable software for implementing the logic set forth in FIG. 2. The pilot trip logic flow chart is depicted in FIG. 10, the transient block mode logic flow chart in FIG. 11 and the carrier send logic flow chart in FIG. 12. Alternatively, the logic of FIG. 2 can be implemented by discrete logic circuits for the functions indicated.

The present invention provides unique advantages over conventional blocking systems. The use of $\Delta I$ and $\Delta V$ for carrier start provides fast start and security to the system because $\Delta I$ and $\Delta V$ are always faster than the pilot trip units. Also $\Delta I$ and $\Delta V$ starts the carriers simultaneously at both ends of the protected line segment. This reduces the channel coordination timing, speeds up system trip time, and provides simultaneous tripping on internal faults. It also solves the problems created in systems where zero sequence current exists as a normal service condition. Finally, all of the required quantities, $\Delta I$, $\Delta V$, reverse Z3P/Z3G, $I_o$ and RDOG, are available in a commercial microprocessor based protective relay system.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A directional comparison blocking relay system protecting an electrical power transmission path segment of a predetermined length against faults, said transmission path segment including circuit breakers at each end thereof for interrupting current in response to a trip signal, said system including a terminal unit associated with each end of said transmission path segment for selectively generating the trip signal for the circuit breaker at the associated transmission path end, and a communications channel between said terminal units for carrying signals between the terminal units, each said terminal unit including:

means monitoring currents and voltages at the associated end of the transmission path segment and generating incremental change signals in response to predetermined incremental changes in said currents and voltages indicative of a fault condition;

forward looking pilot relay means responsive to currents at the associated end of the transmission path segment and having a forward zone extending beyond the length of said transmission path segment in a direction toward the other terminal unit, and operative to generate a forward fault signal in response to currents indicative of a fault in said forward zone, said forward looking relay responding to said fault more slowly than said monitoring means;

transmitter means for transmitting signals over said communications channel to said other terminal;

receiver means for receiving signals over said communications channel from the other terminal; and logic means comprising blocking signal generating means generating a local blocking signal in response to said incremental change signals, said transmitter means transmitting said local blocking signal to the other terminal unit over said communications channel, said receiver means receiving a local blocking signal transmitted by the other terminal as a remote blocking signal, trip signal generating means generating a trip signal in response to a forward fault signal, trip blocking means blocking said trip signal generating means from generating a trip signal in response to either a local blocking signal or a remote blocking signal, and blocking signal stop means canceling said blocking signal generating means from generating said local blocking signal, and hence, the remote blocking signal received at the other terminal, in response to said forward fault signal, whereby said trip signals are generated at each terminal only for internal faults between said terminals and are generated substantially simultaneously at each terminal.

2. The system of claim 1 wherein said monitoring means includes means to digitally sample said currents and voltages a plurality of times per cycle thereof, to sequentially compare digital samples from corresponding times during successive cycles of said currents and voltages to generate said incremental change signals when said comparisons indicate changes above said predetermined changes.

3. The system of claim 1 wherein each terminal unit includes high speed trip means generating a high speed trip signal in response to large faults between terminal units and wherein said blocking signal stop means is responsive to said high speed trip signal to cancel said blocking signal generating means from generating said local blocking signal and hence the remote blocking signal received at the other terminal.

4. The system of claim 1 including weak feed protection means comprising means responsive to said incremental change signals in the absence of a forward fault signal for a preselected interval for generating a signal which is applied to said blocking signal stop means to prevent said blocking signal generating means from generating said local blocking signal and hence the remote blocking signal received at the other terminal.

5. The system of claim 4 wherein said preselected interval is approximately two cycles of the monitored currents and voltages.

6. The system of claim 1 wherein said terminal units further include reverse direction fault sensing means responsive to faults in a reverse direction away from the other terminal generating a transient blocking signal, said blocking signal generating means being responsive to said transient blocking signal to generate said local blocking signal and hence the remote blocking signal at the other terminal.

7. The system of claim 6 wherein said trip blocking means is responsive to said transient blocking signal to block said trip signal generating means from generating a trip signal.

8. The system of claim 7 wherein each terminal unit includes means maintaining said transient blocking signal for a predetermined interval.

9. The system of claim 8 wherein said predetermined interval is approximately two cycles of the currents and voltages in said transmission path segment at the associated terminal.

10. The system of claim 6 wherein said reverse direction fault sensing means comprises reverse direction distance measuring relay means.

11. The system of claim 10 wherein said reverse direction fault sensing means includes means for maintaining said transient blocking signal for a predetermined interval.

12. The system of claim 6 wherein said reverse direction fault sensing means comprises means responsive to zero sequence current above a predetermined threshold and to reverse direction over current relay means.

13. The system of claim 12 wherein said reverse direction fault sensing means includes means delaying generation of said transient blocking signal for a predetermined interval.

14. The system of claim 13 wherein said. preselected interval is approximately one cycle of said currents and voltages at the associated terminal.

15. The system of claim 13 wherein said reverse direction fault sensing means also includes reverse direction distance measuring relay means:

* * * * *